Dec. 3, 1968   J. DE MENT   3,414,838
EXPLODABLE LIGHT SOURCE AND LASER LIGHT GENERATOR
Filed Oct. 29, 1964   2 Sheets-Sheet 2

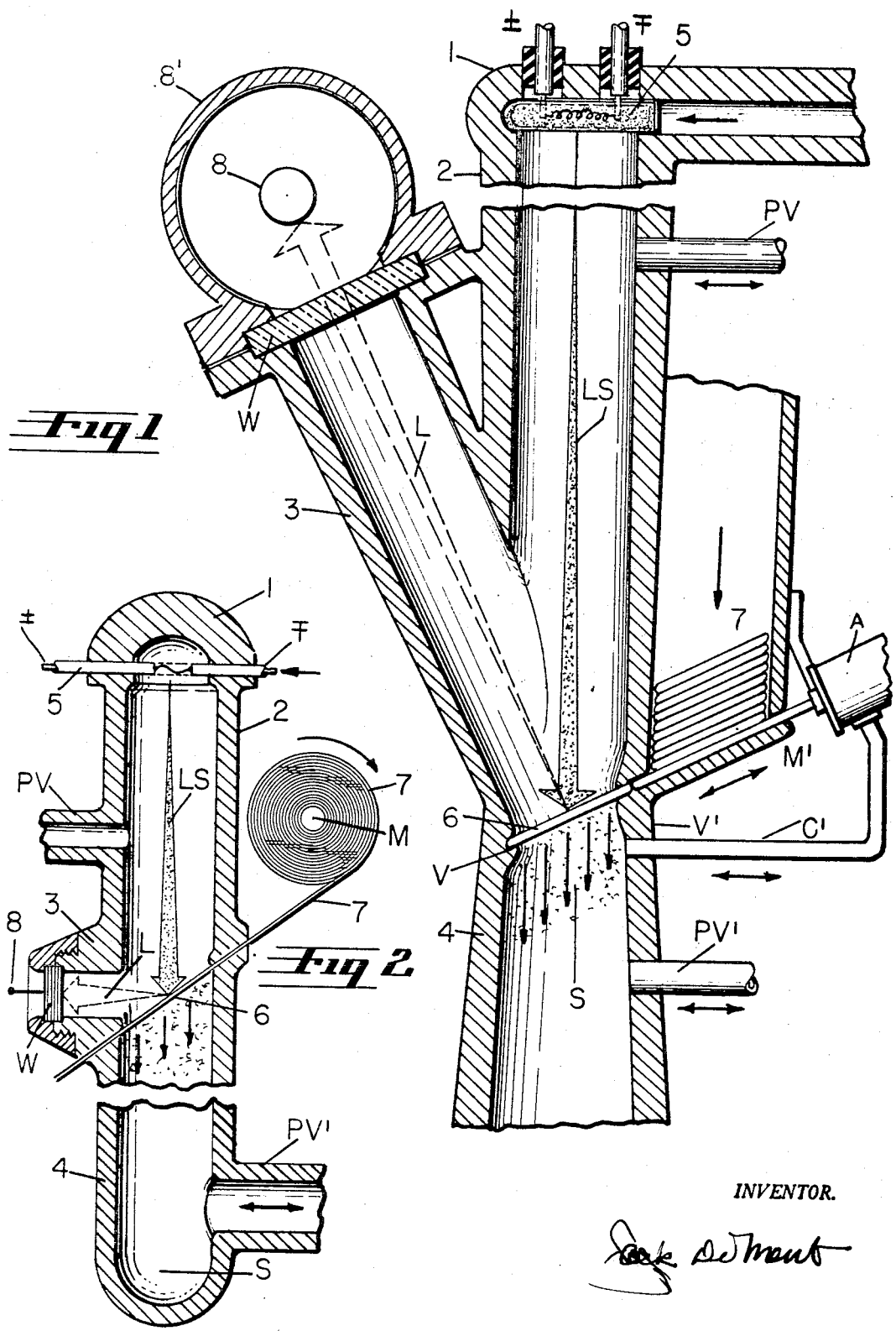

INVENTOR.
Jack De Ment

United States Patent Office 3,414,838
Patented Dec. 3, 1968

3,414,838
EXPLODABLE LIGHT SOURCE AND
LASER LIGHT GENERATOR
Jack De Ment, 4847 SE. Division St.,
Portland, Oreg. 97206
Filed Oct. 29, 1964, Ser. No. 407,461
7 Claims. (Cl. 331—94.5)

This invention broadly relates to an explodable light source and to method and means for parting shock energy from light energy.

In particular, this invention broadly relates to method and means for applying light energy substantially freed of shock energy to an irradiable target such as a laser oscillator wherein the said light energy and the shock energy concurrently originate in an explodable or explosive light source (herein called "ELS").

It is an object of this invention to provide a novel source of light adapted to the production of light with a wide range of intensities over a wide range of the electromagnetic wave spectrum, with or without monochromaticity, as desired.

It is an object of this invention to provide method and means for the production of extremely high fluxes of electromagnetic energy lying between approximately the infra-X-ray and the sub-micron regions of the electromagnetic spectrum, i.e., the very short ultraviolet and the very long or trans-infrared, respectively, but more particularly for most applications the so-called ordinary ultraviolet, visible and infrared regions of the spectrum, said method and means characterized as having a light source which concurrently creates electromagnetic energy together with shock or like energies, said method and means being adapted to parting or freeing the two kinds of energies.

It is another object of this invention to provide method and means for the irradiation of an irradiable target, as for example in applications such as the following:

(a) specialty (e.g., ultraviolet, visible and infrared) photography, microphotography, Schlieren photography and fast action photography; including wind tunnel and explosion phenomena investigations;
(b) luminescence excitation;
(c) atomic absorption analysis, spectrometric and spectro photometric work, and the like;
(d) interferometry and optical design;
(e) flash photolysis and photochemical processing;
(f) outer space radiation simulation; and
(g) generally, the effects of light energy of the kinds previously delineated upon various substances for research and technology.

It is, furthermore, an object of this invention to provide both a novel laser light beam apparatus and method and means for pumping one or an array of laser oscillators so as to create laser light for such applications as the following:

Photomachining, photobonding, photowelding, and photoworking of metals ceramics, and various and sundry inorganics such as glasses and gems and minerals; also, various and sundry organics such as plastics and woods.

Medical and bioscience applications, including photocoagulation, photocauterization, and photomicrosurgery; the injection of optical energy into neoplasia; ophthalmic and cerebral cortex surgery; and the like;

Signaling, communication, range finding and optical radars including uses involving the transmission of intelligence such as computer commands into and within outer space; geodesy and surveying and the alignment of objects such as bridges, missile silos, and structural components generally; and specialty optical intelligence devices including optical computers;

Military problems including weaponry as exemplified by directed energy weapons, focused energy weapons and radiation weapons for soft and hard targets, for both offense and defense, including antipersonnel, antimaterial, antiaircraft, antimissile, antisatellite, and the like; and, in particular, optical countermeasures and laser electromagnetic warfare.

Other objects and features of this invention are particularly pointed out and described hereinafter.

It is a broadly novel feature of this invention that method and means are provided for separating light or electromagnetic energies lying in the optical and adjacent to the optical regions of the spectrum from sonic and shock and similar energies. This is accomplished by virtue of the difference in velocities between the two forms of energy. This, the velocity of light exceeds shock and like energy velocities by a factor of approximately 4 to $8 \times 10^5$. It is thus seen from FIG. 1 and the other illustrations depicting this invention that light generated by an exploding light source concurrently with shock energies reaches a frangible mirror or like destructible optic element far before the shock waves, to be reflected or diffracted into the area—called the "light leg"—carrying an irradiable target whereas the shock waves striking the same mirror subsequently break or destroy that mirror and continue on their journey into the "shock sink" portion of the system.

Consistent with what has been stated above, it is another feature of this invention that shock energy velocity may be varied while the light energy velocity remains essentially unchanged. Thus, by pulling a vacuum within the system the gaseous elastic medium necessary for the propagation of shock energy is largely removed: This permits the use of explodable light sources characterized by very high shock outputs. Moreover, the system can be pressurized so that a part of the shock energy is translated into light energy via the excitation of an appropriate substance such as a noble gas-like argon.

The entire system can be operated under normal laboratory or engineering or field conditions, e.g., within the atmosphere; or, in outer space; or, under water with appropriate electrical and like integrity maintained in the case of light sources which depend upon high voltages; or, under a bath of coolant with say the light source and the portal of the light leg above the surface of the coolant, whereby to reduce heating.

It is a feature of this invention that there is provided a unique source of electromagnetic radiations originating in various explosive chemical reactions, in explodable conductors; in high energy sparks; and in like mechanisms detailed later wherein a shock pulse is separated from an electromagnetic wave pulse, and the latter is frequency shifted or at least provides bands of desired quantity and quality.

It is a feature of this invention that a shock sensitive target is adapted to irradiation by extremely high light fluxes originating in an explodable light source, the said light fluxes being substantially free of shock energies.

It is a feature of this invention to provide a new and basic kind of light source which is flexibly adapted to the production of shock-free light pulses lying over a very wide range of the optical spectrum and extending far into both the infrared and ultraviolet, as desired.

It is a feature of this invention that operancy includes a wide range of physical and chemical conditions. For example, not only under ambient conditions but also within hostile environments, e.g., within radiation fields, corrosive atmospheres, in outer space, and the like.

The principles of the present invention will be better understood from the following more detailed discussion taken in conjunction with the accompanying drawings, wherein:

FIG. 1 shows in side-elevation certain of the features which illustratively embody principal elements of my system for parting light and similar kinds of electromagnetic energy from shock energy;

FIG. 2, also in side-elevation, is a version similar to that of FIG. 1;

FIG. 3 is an electrooptical schematic diagram, wherein the explodable light source is an exploding wire or the like;

Figure 2A:
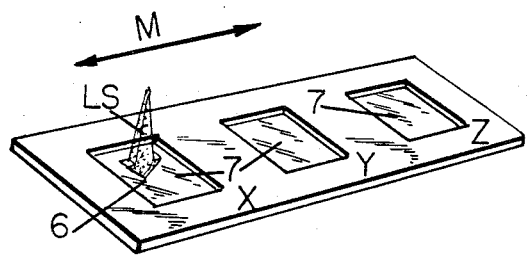
FIG. 2A represents a frangible optic element in perspective, said frangible optic characterized by translational movement cooperantly with the whole system set out herein, and described in more detail hereinafter.

Taking the drawings in more detail:

In FIG. 1 there is shown in side-elevation an illustrative form of this invention for creating intense bursts of electromagnetic radiation like light, said bursts of light being derived from an explodable light source (ELS). Typically, the system comprises a tube 2, having conjoined thereto a top member 1 wherein there is contained an explodable light source 5; a tubular arm 3 connected to 2; and a "shock sink" tube 4; the entire system, in this case, it will be seen, comprising a Y-shaped hollow pipe-like structure. The ELS may be fed in cartridge form through a tubular member which is an extension of 2, and shown by the arrow; in the version here shown the cartridge carries an exploding wire embedded in plastic, with electrodes connecting to the surface of the plastic cartridge and being affixed to each end of the exploding wire; when this cartridge is moved into chamber 1 it closes a high tension electrical circuit which causes the wire to explode; the cartridge is fed by any convenient pneumatic or mechanical means, as by such systems as are well known in the automatic weapons art and which need not be detailed here. Upon exploding of 5 there is created an intense burst of light concurrently with shock and like mechanical energy, designated by the arrow LS (indicating "light-shock"), together with varying amounts of debris, the latter depending upon the particular kind of ELS employed (in certain modifications there will be little or no debris, as described subsequently).

Further in FIG. 1, LS travels down the tubular member 2, which is constructed of heavy-duty material such as steel or, in certain instances, spiralloy, to strike element 6 which is a frangible optic. Because of the greater velocity of light as compared to shock, the light strikes the optic 6 first, thence to be reflected as light L up leg 3 to strike an irradiable target 8 such as a laser resonator carried within a chamber 8', the latter being optional, as is the case of W which represents a window, filter, slit or other like optic element. Shortly thereafter the shock and debris, the latter if present, strikes the frangible optic 6, causing 6 to break or fragmentate, the pieces of which together wih the shock energy and debris now move down into the shock sink 4.

It is important to note in FIG. 1 that the angular relationships between the three tubular members 2, 3 and 4 be such that the angle between member 2 and member 3 correspond to that elementary law of optics wherein the angle of incidence corresponds to the angle of reflections; the angularity of member 4 may be abrupt just as long as it acts as a sink or receptacle for the shock energy and degris.

Further in FIG. 1: PV and PV' represents pressure-vacuum piping, whereby the entire chamber or tube elements 2 and 3, as desired, may be evacuated, pressurized, or filled with gas having special luminosity characteristics, e.g., argon in the case of chemical explosives injected in cartridge or like form into chamber 1 and electrically detonated; it is well known in the art that upon detonation a pluse of argon-derived light is produced. Furthermore, the construction of the system may be such that, as represented by V and V' there is a differential head produced in accordance with Venturi's law; thus, V and V' represent a constriction of flow of S or shock-debris matter, and this constriction can be a narrowing of the portion of the system adjacent to and about optic 6, or a constriction of flow can be produced by mounting into the orifice behind 6 a metal or like disk so as to form a differential head that is proportional to the square of the flow for a given embodiment of my apparatus; again, these embodiments need not be set out in detail as they are well known to those skilled in the art of hydrodynamic flow.

Again in FIG. 1: the numeral 7 shows a magazine of frangible optics, in this instance being square, rounded, or the like and injected into the position of 6 by means of apparatus A, which may comprise pneumatic, electromagnetic, or a like feeding device; the motion of a fresh, unbroken optic 6 fed from magazine 7 is depicted by M': when pressure differential is employed for actuation, according to the afore-mentioned Venturi principle, a coupling tube C' provides the actuating force for optic 6 feed-in. It is noted that the optic 6 may abut the side wall of 3–4, or, depending upon the modification, seal off into a slit carried in the wall facing the lead edge of optic 6. The letter S depicts the shock energy and, if present, the debris, from both the explodable light source and the comminuted optic 6. The bottom of leg 4 may or may not be sealed off.

In FIG. 1: the firing or like electrodes are designated by the usual plus-or-minus or minus-or-plus signs. I point out that for purposes of this disclosure each of these may be considered the equivalent of injection nozzles, into chamber 1 of FIG. 1, whereby there is, for example, pumped in for expolsive-type and light-giving reaction a two-phase hypergolic reaction mixture, each of the reactants being separated until combination. Examples of hypergolics include metal-organics with an appropriate gas; e.g., trimethyl and triethylaluminum, and diethylzinc (with oxygen or chlorine).

FIG. 1 also depicts a form of this invention in which the three conjoined legs, i.e., the light source leg 2, the shock sink leg 4 and the target leg 3 movably join, at the junction of which is the destructible optic element 6 and its ancillary feed mechanism A: thus one or several of the legs can be movable. The joint at which the three legs converge may thus be a Y or T or like joint of a ball-and-socket character. Taking the different versions as analogs of spectrograph mountings well known to those skilled in that art, it will be seen that FIG. 1 depicts a structure corresponding to a Rowland Circle type of arrangement, wherein all legs are rigidly mounted and the frangible optic feeds in sequence, synchronized with the sequence of the exploding light source; that is, the ELS does not move except for replenishing shots and the irradiable target leg also is immovable and the shock sink leg also is immovable.

Of the several and variegated movable joint structures available for carrying out the embodiments characterized as wholly mobile or partially mobile, it is preferred that the typical ball-and-socket type or like joint be employed at the crotch of the legs. This may be gas-tight, as desired; such a ball-and-socket joint joining hollow legs (cylindrical, triangular, rectangular, etc.) may also be rotatable for specialty applications of this invention. Moreover, in the case of the system having at least one rigid or immobile leg the feed-in frangible optic element 6 and its ancillary feed mechanism A is placed above the said joint and within and concomitant with the immobile leg; the optic element 6 may be arranged for variable angular positioning so as to correspond to yet another leg which is immobile, to eliminate for example the need for mobility in the particular leg (or "arm") involved.

Another representative version of this invention is analogous to the Wadsworth mounting of spectrometry, wherein there is a frangible concave mirror or reflection grating optically coupled to or in line with the ELS 5 and behind which there is the shock sink leg. This concave (which may be plane, as desired) optic element reflects light onto a second reflection element, e.g., mirror or grating, the second element preferably being concave (but which may be plane, again as desired) and either frangible or non-destructible, preferably of the latter type. Optically aligned with the secondary optic is the irradiable target, such as a laser resonator.

Moreover, there may also be a mounting corresponding to the Abney type mounting wherein the frangible optic 6 is immobile, while the ELS and target leg 3 is laterally movable. Or, the arrangement may correspond to a Paschen mounting, wherein the shock sink 4 and the ELS leg 2 is immobile and the irradiable target 8 is laterally mobile.

It is noted that various combinations and/or permutations of the mobility-immobility principle of this system with respect to one or more of the legs of this invention can be employed, with or without the compounding of similar or dissimilar systems, i.e., one such system coupled to another system or like or unlike kind, so I do not wish to limit myself in this respect. While I have depicted typical and illustrative structural configurations and arrangements, I point out that spatially many combinations and permutations are readily had, and therefore I do not wish to be limited as regards those parameters involving dimensionally. Thus, all three of the legs, whether movable or some rigid, may be in the same geometric plane; or, by the same token, one or more of the legs may be out of that geometric plane and at a convenient and appropriate angle, upwards, downwards, or the like, usually as dictated by the angularity of 6.

For example, an arrangement can be an analog of the Eagle-Littrow type of mounting, wherein the ELS 5 and the breakaway optic 6 are aligned, with the shock sink leg 4 directly behind the optic 6 and generally in the same plane thereof; the frangible optic may be aligned at 45 degrees or any other convenient angle with respect to the ELS 5, its reflecting face aimed at the secondary plane or concave optic, which may be frangible or non-frangible (preferably the latter), which optic throws light down past the first and frangible optic into the irradiable target, e.g., the target is mounted at 90 degrees or other appropriate angle with respect to the ELS leg 2 and the conjoined shock sink leg 4.

Referring to FIG. 2: There is shown another modification, wherein the numerals and the letters designate what has been set out for FIG. 1, with the exceptions hereinafter described. ELS 5 can be an exploding wire source or it can be a chemical explosive, contained within ELS chamber 1 and fed by the electrodes designated plus-or-minus and minus-or-plus. One of the features in this embodiment show a roll-in tape magazine of frangible optic 7, which upon entry through an appropriately constructed slit in the wall of 2, at an angle appropriate send LS to member 6, thence to L as light freed from the shock designated by S.

Figure 2B:
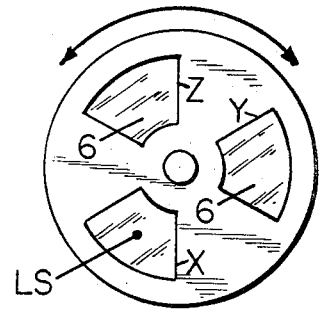
FIG. 2B is like FIG. 2A, except that it is characterized by rotational motion.

Before describing FIGS. 2A and 2B in detail, it should be noted that the frangible optic 6 of FIGS. 1 and 2 enters the body tube as shown through an appropriate aperture or slit. The frangible optic 6 can be contiguous and rigidly self-supporting in structure or, as shown in FIG. 2A, may comprise a basic support frame having frangible optic mirrors 6 and 7 or X, Y and Z, with the light-shock depicted as LS, as previously explained. FIG. 2A illustrates M, which is translational or to-and-fro motion in-and-out of the body tube just above 4 shown in FIG. 1; the advantage here is that light bursts of varying frequency can be had by use of optics which are preferentially reflective and/or diffractive. In FIG. 2B the optics 6 are carried in a frame or support member which is rotated; only one optic, say X, is within the body tube at the moment of the ELS detonation, whereas Y and Z are outside that body tube at the moment of detonation.

Figure 2C:
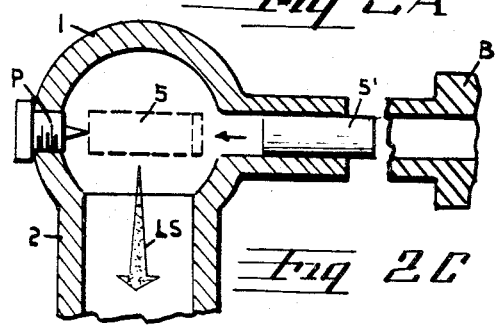
FIG. 2C depicts a typical form of explodable light source.

In FIG. 2C there is shown in side-elevation an embodiment of the explodable light source, taken off FIG. 1, wherein 1 is the chamber in which the ELS fires, and 2 is the body tube down which LS or light-shock passes on its way to the frangible optic 6. A cartridge of light producing chemical composition is fired via B (the shooting mechanism, which may be pneumatic, mechanical, explosive or the like); the cartridge 5 strikes the firing pin P and is made to detonate, giving LS, while immediately thereafter a fresh, unexploded cartridge 5' is on its way into chamber 1 to strike P and provide a second burst of LS energies.

Figure 2D:
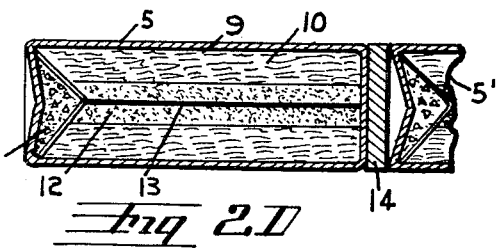
FIG. 2D shows an active member of that explodable light source, namely member 5 taken from FIG. 2C.

FIG. 2D shows pyrotechnic, explosive, or like type of cartridge construction, wherein 9 is a thin cartridge wall, say of rigid, fragmentable plastic or metal having a filling 10 of light producing explosive composition, this preferably being of low order detonation variety; 11 is the blasting cap or primer charge, as for example one of the azides or fulminates well known and used in the explosives art, 11 being the portion which strikes firing pin P; optionally, the cartridge 5 may carry fine metal, noble gas compound, or like light producing particulate as well as a central stringer of detonating charge 13 which serves to detonate and fire the composition 10; 14 is an optional spacer to protect the unfired cartridge 5' which is readied for firing, as explained for FIG. 2C.

Figure 3A:
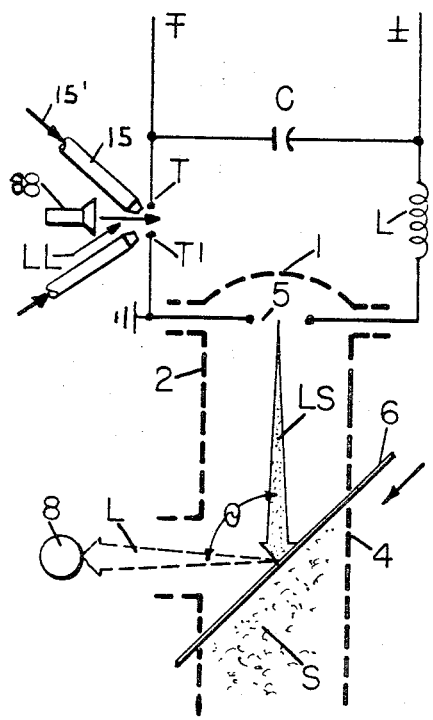
FIG. 3A is similar to FIG. 3, except that the explodable light source is a high tension, exploding variety of electric spark.
Figure 3:
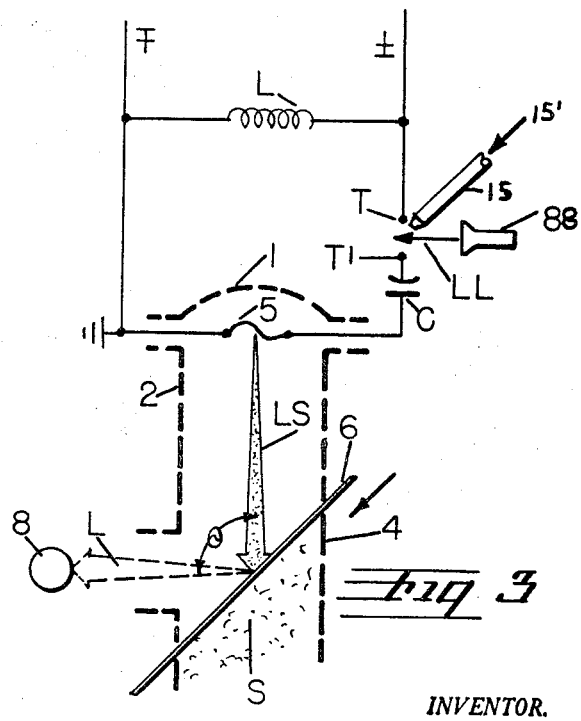

In FIG. 3 there is schematically shown a typical ELS comprising an exploding wire, wherein 5 is the wire; 1 is the ELS housing or chamber; 2 is the body tube throat down which LS travels; 6 is the frangible optic fed at an appropriate angle, B, into the tubular member 4; L is the light reflected, diffracted or otherwise deflected from 6 into and upon the irradiable target 8; and S is the shock and other debris from the ELS 5 traveling down the member tube 4 into the shock-sink.

The schematic circuitry of FIG. 3 may, for example, comprise wire 5 of 1 mil diameter and several inches length; C is say a capacitor or energy storage bank of 2000–3000 micromicrofarads; L is the circuit inductance of 0.1 microhenry, to which circuit there is applied a voltage ranging between 15 and 20 kilovolts. In FIG. 3 there is a switch T–T' which may be of varied character, but which should have a time constant of approximately less than 10 millimicroseconds in the example given here; a number of such switches are known in the electronics art, and need not be detailed. However, I prefer as a novel embodiment of this invention a laser light switch, as follows:

Thus, T–T' represents in FIG. 3 a break in the power feed circuit line contiguity; at a convenient angle to the gap there is placed a small laser light generator 88, producing a beam of laser light LL which upon passing through the gap T–T' causes ionization of the air between T and T' and a consequent switching through and into the capacitor C; needless to say, the time constant of such a laser switch is extremely fast, and can be of the order of tens to hundreds of nanoseconds; the laser generator should be powerful enough to cause air ionization and consequent conductivity. As an added feature, there may be provided a dielectric or other suitable gas or vapor injector tube or nozzle 15, which is fed with gas vapor 15'; the purpose of this arrangement is to lower the time constant of the switching mechanism T–T' via the agency of a substance such as a gas 15' injected into the gap T–T' which has an ionization potential much lower than that of air, or, wherein the substance 15' flames or deflagrates to produce an electrical pathway between T and T' by virtue of flame conductivity. As a lesser preferred alternative, laser resonator 8 may be dispensed with and 15 becomes a flame or arc injector, to achieve the same end result. As far as ionization potential goes, substances such as benzene (9.6 volts—I), toluene (8.5 volts—I) and nitric oxide, NO (9.5 volts—I) are examples.

Referring now to FIG. 3A: The numerals designating the components of the schematic are those set out for FIG. 3, with for example a xenon pumped ruby laser 88 employed as the switch to carry the pulse of high tension electrical energy over and through gap T–T'. Attention is to be given to 5 and the electrodes which form a spark of explosive nature. The electric spark is infrequently used as a source of intense light because it creates a shock wave of a low order of detonation. FIG. 3A is typical of such an energy source. As before, the inductance and the capacitor bank may vary according to the desired sparkover. For those skilled in the art a typical example of a relatively small energy unit follows.

Thus there is shown in FIG. 3A a circuit schematic wherein there is a capacitor C; triggering means T–T', as previously described, but also which may comprise as in the case of FIG. 3 a thyratron switch, triggered spark gap, mechanical or electrical relay, ignitron, or the like, all depending upon the time constant desired; a self-inductance coil L, which introduces additional self-inductance into the circuit so that the rate of oscillation of sparkover between ELS electrode gap 5 may vary inversely as the square root of both the capacitance and the self-inductance of the circuit; L is in series with gap 5.

It is noted that the spectral output of such a spark circuit, characterized as producing an intense burst of light along with shock energy, involves both the excitation of gas (such as air) within gap 5 and the nature of the electrode material comprising gap 5; the latter may be of metal having broad or narrow spectral emissivities.

By using very large induction coils L (in FIG. 3A) in series with condensers of very high capacitances, extremely brilliant flashes of light are obtained concurrently with shock energy. In fact, atoms may be "stripped" of electrons so that short ultraviolet light is obtained, should this be desired. The temperature of such explosive sparks may be of the order of $3 \times 10^{5\circ}$ K., and wavelengths as short as approximately 40 angstroms are obtained when there is employed a capacitance member C of 0.3 microfarad charged to 60 kilovolts.

When I speak of an "explodable (or explosive) light source" ("ELS") I include the following examples but do not wish to be limited in choices so I do not exclude other light sources which are characterized by the concurrent production of shock and sonic and like energies together with portions of the electromagnetic wave spectrum: (1) chemical deflagratables, explosives and the like, including gas-dispersoids (e.g., solid and liquid particles), vapors, liquid and solid explosives, and modifications of these, such as flash cartridges and explosive coated foils; (2) high tension sparks and arcs; (3) explodable and implodable conductors such as exploding wires; and the like.

The ELS is introduced singly or multiply, synchronously with the replacement of frangible optic 6, and exploded or fired by means appropriate to that ELS. The ELS introduction and feed and firing, as in the usual and preferred case of sequential feeding, also is appropriate to the particular light source and may be translational, rotational or combinations of both. The ELS, again depending upon its nature, may be injected into chamber 1 of the light leg 2 of the system and exploded or fired with or without feed-through of debris or carrier member, e.g., in the case of an explodable flash cartridge the entire cartridge is consumed in the explosion and the debris swept away by Venturi or other means set out herein, so that the next shot can take place; or, an enstructured explodable conductor has the enstructuring member carried on through and out of the chamber and down leg 4 so as to clear the apparatus for the shot which follows. For purposes of this disclosure and for the aid of those skilled in the art as well as those contemplating practise of one or more versions of this invention there follows a description of salient aspects and features of typical explodable light sources.

An explodable light source ELS of the chemical variety is typically a thin-walled cartridge of an organic or metal-organic compound such as trinitrotoluene, pentaerythritol tetranitrite, mannitol hexanitrate, picric acid, tetranitromethane, RDX or the various metal azides. These may or may not carry suitable additives, e.g., those which permit easier handling with less hazard or shock detonation, as well as fine metallics which impart greater luminosity to the explodable light source. Such explosive systems can be carried upon the surface of or within surface depressions of a medium such as destructible metal sheet, plastic, ceramic or the like. The explosive is detonated by means of a spark gap arranged laterally to the mass of explosive, by electrical heating by means of resistance (as through a metal carrier or an embedded wire), or the like. The masses of explosive are spaced upon the carrier, each being exploded in sequence at any convenient or desired rate. The carrier member may be of plane geometry with the mass on the surface or it may be of concave geometry so as to provide directionality (to the breakaway optic element at the juncture of the legs) of the shock-light energies.

Metal-organo azides, metalloid-organo azides and certain related compounds such as hydrazoic acidics and chlorazides not only are explosive but have the peculiarity of emitting light depending largely upon the nature of the cationic portion of the molecule. It is therefore evident that this is a large and useful class of explodable light sources, only a few examples of which can be set out herein; others will be found in the literature and will be familiar to those skilled in the art. However, as examples, lead and copper azides, including the basic compounds of the latter, provide emissivity peculiar to the metal present. These ELS materials are exploded by percussion, as by a pin firing initiator arrangement of the character used in conventional firearm shells (see FIG. 2D), and by heat, as by the passage of suitable current or spark into the ELS substance, mentioned previously.

Upon explosion of the aforementioned variety of light source the substrate or carrying member disintegrates and is carried into the shock sink leg 4 or, as desired, portions are received by a small sump provided in the structure at the point where the explosion takes place. With metal substrates, e.g., brittle metal foil or metallized plastic, and large temperatures particles of the metal incandesce and contribute to the light output; magnesium, aluminum and zirconium are metals which can be employed for this purpose.

It is known that if there be applied to a suitable electrical conductor such as a thin wire, film or foil, that conductor will explode with the release of a very large amount of light. It is not deemed necessary here to expound in detail upon the theory of explodable conductors, but for the aid of those in the art reference can be made to volumes I and II of the tomes "Exploding Wires," edited by Wm. G. Chace and H. K. Moore (at Plenum Press, New York, 1959 and 1962, respectively).

However, suffice to state that the art is presently in a fluid state and that no single model accounts for all of the phenomena involved in what has been termed the "exploding wire phenomenon," but which is better termed the "exploding conductor phenomenon." The exploding conductor can be looked upon as a black-body:

$$(d/dt)(MC_v(T)T) = P - \sigma A T^4 - (dE/dt) \ldots$$
HYDRODYNAMIC where M is the mass of the explodable conductor such as wire of film; $C_v(T)$ is the specific heat at constant volume; T is the wire temperature in °K.; P is the electrical energy deposited in the conductor in watts; $\sigma$ is the Stefan-Boltzman constant; and A is the area of the exploding conductor. When the conductor is heated very quickly the hydrodynamic loss is negligible. Since the temperature is proportional to the fourth root of the input power divided by the surface area of the conductor, it is evident that energy depositions into large surface area conductors is preferred in most instances. If the radiated power is equated with the electrical power, the relationships become:

$$T=(P/\sigma A)^{1/4}=(I^2R/\sigma A)^{1/4}$$

where T is the temperature; I is the current; and R is the resistance; therefore: $T^4 \alpha I^2$.

It will be noted that these relationships do not always hold, as for example in the ultrahigh energy, ultrashort time domain of the exploding conductor phenomenon which, although known for many years, has received serious theoretical and investigational attention only during the last decade, with many puzzling and unexplained facets turning up with each research.

In propelling one or a number of rounds of light emitting explodable conductor projectiles (5 in FIG. 1) I prefer to rely upon the automatic weapons art with high pressure gas as the propellant. There are a good many of these systems known, and since they are within the skill of the artisan they are not deemed necessary of detailed description here. When, however, it is desired to propel a light emitting projectile 5 into firing chamber 1 both at very high firing rates and at several or more Mach number velocities automatic weapons-type feeding, as for example machine gun ammunition canister or belt ammunition feedings are used; chemical explosive propellant is then used, and the projectile, usually cylindrical, merely replaces the conventional metal bullet in the cartridge case which contains solid propellant, e.g., black gun powder or other suitable explosive, and the usual primer for firing (cf. FIG. 21). Modern automatic weapons fire as high as 600 rounds per second, as in the case of the electric-Gatling gun or the Gatling-Vulcan gun. By the same token a complementary firing apparatus of the same or similar nature can be employed to fire fresh, unbroken and ready-to-use frangible optic (e.g., 6 from magazine 7 in FIG. 1) into place within the system. Both firing systems operate synchronously at any convenient rate.

Depending upon the modification the matrix or sheath member for the explodable conductor may be of a single material or composite involving several materials. The common properties of dielectric strength and substantial transparency and frangibility apply to all choices. Examples of matrix materials include various plastics and tempered glasses, and inorganics. In the case of plastics and glasses additives such as colorants may be included for the purpose of blocking a given portion of the spectrum. Likewise, the exterior of the matrix member can be layered, coated or similarly treated with filtering media, as for example infrared and/or ultraviolet absorbent materials to cut down the heat released but still pass other portions of the spectrum.

The dynamic load undergone by the enstructuring member of the cartridge 5 in FIG. 1 may be controlled or minimized in one or more of several different additional ways. These include: (a) varying the size of the explodable conductor, e.g., as by use of very fine wires or thin films; (b) control of the power surge through the conductor, as by dropping the voltage; (c) increasing the size of the matrix member, e.g., in radius in the case of a cylindrical assembly; (d) selection of brittle or low strength matrix material and combinations thereof; (e) the use of composite matrix structuring, e.g., plastic and brittle glass laminates, also by the use of glass fiber or tape winding, as well as by the use of plastic containing silica or glass fibers embedded within it; (f) by the use of implosion or explosion-implosion conductor arrangements; (g) by providing shock energy escapements such as by venting, e.g., making the matrix wall of 5 thinner on the side through which the explosion-derived light passes so as to provide a breakaway escapement and hence a venting of the shock energy into the shock sink.

The explodable conductor is typically a wire of small cross-sectional diameter and large surface area, e.g., ranging from several tenths of a mil in diameter to several tens of mils in diameter; in addition, the filamentous conductor may be of cross-sectional geometries other than circular, as for example, square, triangular, flat. These may be straight, coiled, zig-zag or of other convenient configuration taken linearly (see 5 in FIG. 1). Moreover, the conductor may be solid (coated or uncoated); laminated, or sandwiched or hollow (also coated or uncoated); laminated, sandwiched or with composite conductors an assembly or more than two conductor materials can be used for dilating the frequency output. The conductor can be of any convenient length, e.g., from several tenths of an inch to several inches, depending upon the modification and the deposited energy.

As the explodant a thin film or foil of metal or other suitable substance can be employed. For example, in thicknesses ranging between several tens and several thousands of angstroms. These are laid down upon a suitable substrate, preferably a breakable one, e.g., silica, glass, plastic, by chemical deposition, vacuum evaporation or the like. They may be of any convenient dimension: a typical explodant metal film is 200 angstroms thick and is approximately one inch in width and two inches in length. This film is exploded along its length by the deposition of electrical energy therein, for example, by a power source made up of a 1.4 microfarad capacitor charged to voltages ranging between about 2500 and 5000 volts.

The light-producing explodable conductor can be of an imploding type with or without an exploding conductor operating simultaneously. A typical implosion conductor member is a hollow cylinder or tube the inside surface of which carries the implodant in the form of a film or thin metal foil. When electrical energy is injected into the implodant an implosion takes place. As desired, an axial explodable conductor, e.g., a fine wire, may simultaneously receive an electrical energy deposit sufficient to cause it to explode. A typical arrangement is a cylinder 0.5 inch in diameter and one inch in length; the inside wall is coated with implodant conductor material of thickness ranging between approximately 50 and 500 angstroms. The electrical energy is supplied at the ends of the cylinder, as by means of annular ring or disk contact electrodes, causing uniform energy deposition and an inwardly collapsing shock wave. One of the manifest features of the implosion type of conductor is that the shock insult is lessened for the chamber 1 (FIG. 1). With this arrangement an exploding circuit includes a 1 microfarad capacitor charged by a transformer, e.g., 15 to 50 kilovolts.

The choices of conductor material include pure metal or conductive elemental substance, alloys including amalgams, and composite assemblies. In the latter instance these can be braided or twisted wires, also stacked or laminated foils or films, or coated conductors (e.g., surface-amalgamated for enhanced explodability). Core-filled conductors are preferred for highly reactive substances, e.g., the alkali metals, for ease of fabrication, and for substances which are selected for emissivity-compositional qualities. For example, microtubes filled with fine (often pyrophoric) metal powders or reactive metals, non-metals, or metalloids; also, various allotropes, e.g., phosphorus, carbon, selenium; also, solid compounds carrying one or more elements of particular spectral interest, e.g., hydrogen, deuterium, and tritium alloys with metals, deuterohydrates; field valency hydrides or deuterides of iron or nickel, or the so-called saline compounds of hydrogen or deuterium and metals of the first, second and third chief subgroups of the periodic system which give solid, colorless hydrides or deuterides, viz., all of the alkali metals, the elements calcium, strontium and barium of the second group, and the rare earths of the third group.

As explodants I prefer elements and their isotopes selected from the periodic system, as follows: Group I-A (Li, Na, K, Rb, Cs); Group I-B (Cu, Ag, Au (which metals give better explosions when surface-amalgamated with mercury)); Group II-A (Be, Mg, Ca, Sr, Ba); Group II-B (Zn, Cd, Hg); Group III-A (B (which has good conductivity after the initial resistance heating which occurs or when it carries traces of carbon), Al, Ga, In, Tl); Group III-B (Sc, Y, La); Group IV-A (C, Si, Ge, Sn, Pb); Group IV-B (Ti, Zr, Hf); Group V-A (P, As, Sb, Bi, as nitrides or the like); Group V-B (V, Nb, Ta); Group VI-A (sulfur and oxygen as compounds, Se, Te); Group VI-B (Cr, Mo, W); Group VII-A (the halogens as compounds); Group VII-B (Mn, Re); Group VIII (Fe, Co, Ni, and the platinum metals); and, in particular, for laser pumping because of their many well-defined spectral lines the lanthanides (Ce, Pr, Nd, Sm, Eu, Gd, Tb, Dy, Ho, Er, Tm, Yb, Lu) as well as the actinides (Th, U (and for specialty research and investigational utilizations the transuranium elements)).

The explodable conductor can be alkali metal, e.g., potassium, sodium, cesium, in pure form, alloyed with another alkali metal, or amalgamated with mercury. In this embodiment I prefer that the alkali metal explodant be carried in fine glass or silica capillary tubes which are in electrical communication with the electrode members. I point out that when such explodable conductors are employed, the active species in the case of the laser oscillator may be of the same or similar alkali metal for increased efficiencies. For example, a cesium vapor laser is stimulated by light from a mercury arc; I refine and extend in this invention by the use of a cesium-mercury alloy (amalgam) explodable conductor which provides pumping energies derived from both mercury vapor and cesium vapor. If an implodant alkali metal conductor is desired, the implodant material is layered onto the inside surface of a glass or other suitable substrate.

For low temperature and outerspace applications of this invention, as for example in laser pumping in the chill of outer space, explodant comprising the Group 0 or so-called inert gases is of particular interest. As is known, electrivalent or covalent compounds normally are not formed by the inert gases, as their electron shells are complete and there is no tendency either to lose or to gain electrons. However, the inertness of these gases (He, Ne, Ar, Kr, Xe) is not so great as is usually supposed. Hence, with respect to my remarks given supra about hydrides, deuterides and the like, I point out that the inert gases can comprise explodant material in this invention. Thus, several of them form hydrates and deuterates which are the analogs of the other hydrates of elementary gases. They are formed by introducing water vapor into an atmosphere of the inert gas at low temperature. The crystalline solids thus formed are of varied stability, the decomposition temperatures at one atmosphere pressure being; argon hydrate (−24.8° C.), krypton hydrate (−39.2° C) and xenon hydrate (0° C.). In addition a number of organic compounds are known, as for example xenon diphenol. Helides, combinations of helium with other elements, include helides of mercury, iodine, sulfur and phosphorus formed by electron bombardment or glow discharge, the electrical disintegration of certain metals in helium gives combinations such as tungsten helide $WHe_2$.

While a number of heat decomposable solid noble gas compounds, including clathrates as well as bertholides and daltonides, can be used in this invention, as just mentioned, to supply via quick decomposition a noble gas atmosphere, I prefer certain xenon compounds, as for example the xenon fluorides. One of these may be taken for illustration:

$$XeF_4 \xrightarrow{(heat)} Xe+2F_2$$

The xenon tetrafluoride is a colorless, crystalline solid which is stable at room temperature, has a vapor pressure of several millimeters of mercury, and is storable in silica, Pyrex, nickel and fluorocarbon (polychlorotrifluorethylene) containers. The thermal decomposition of $XeF_4$ releases the xenon which very strongly luminesces as a result of the energy dynamics occurring with chemical or conductor ELS, while at the same time the fluorine freed from its bound and non-available form becomes available for reaction with the metal foil, filament or like composition that can be present in the ELS. Xenon difluoride and various xenon oxyfluorides resemble xenon tetrafluoride. Compounds of krypton and fluorine are similar, although generally less stable.

The amount of decomposable solid noble gas compound used per ELS unit can vary according to the particular size and design modification. It is therefore apparent that a wide range of loading quantities of the gas compound can be employed, and that in this regard I do not wish to be limited in scope. Those skilled in the art can readily calculate the amount of solid noble gas compound to be employed in a given modification of this invention by means of the usual gas laws. Thus, 1.15 grams of krypton tetrafluoride, upon decomposition above approximately 60° C. yields up to 500 cubic centimeters each of krypton and fluorine gases (at normal temperature and pressure). Similar parameters generally apply to the various xenon fluorides and xenon oxyfluorides and, in the event that the application is directed to the so-called exotic and sophisticated areas of research, and to the various radon fluorides.

An embodiment of this invention is the spectral coupling or matching of the explodable conductor pumping source and the active, absorbing species or particles comprising the lasing cavity (e.g. 8 in FIG. 1). This not only enables greater pumping efficiency, but also greatly extends the laser light frequencies potentially available. For example, in the 8000 angstrom spectral region between 2000 angstroms and 1 micron, the medium-far ultraviolet to the near infrared, respectively, upwards of several thousand lines are emitted by the spark spectrum, the low energy analog of the exploding conductor phenomenon, for such elements as iron. With chromium four wavelengths (6934, 6943, 7009 and 7041 angstroms) are now pumped when a xenon is flashed on a ruby laser. An exploding chromium conductor, on the other hand, gives off at least 1200–1800 lines, providing a potential gain of frequencies numbering 300–400. Upwards of several thousand lines, with such elements as uranium and the rare earths, are produced.

In the aforementioned connection and for the interest and aid of those skilled in the art, particularly the research and investigational facets employing this invention, the explodable conductor and the active species of the laser may each be of electromagnetically enriched isotope. Thus, a selection for laser ruby may be of an explodable wire of $Cr^{53}$, $Cr^{54}$ or $Cr^{50}$, enriched to 98 percent, 95 percent and 95 percent, respectively. For samarium doped calcium fluoride lasers, for example, the isotopes may be $Sm^{152}$ (99%), $Sm^{150}$ (98%) or $Sm^{144}$ (90%); for gadolinium doped glass laser, $Gd^{160}$ (99%), $Gd^{158}$ (99%) or $Gd^{156}$ (97%); for neodymium doped molybdates (Pb, Sr, Ca) or tungstates (Ca, Sr) or glass lasers, $Nd^{150}$ (97%), $Nd^{148}$ (95%) or $Nd^{145}$ (95%); other choices will be apparent to those skilled in the art.

The power source or electrical feed energy for the explodable conductor assembly is usually a high voltage transformer and one or more capacitors. A number of such systems are well known and can be found described, for example, in the Chace and Moore tomes cited previously. Generally there is a switch in one lead from the capacitor bank, this usually being thyratron, trigatron or three-electrode. It is desirable that all of the bus work be designed for minimum inductance consistant with the maximum voltage employed. The circuit functions by charging the capacitor bank to the desired voltage with an adjustable voltage supply. The energy in the bank is:

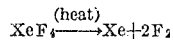

where J is the energy in joules; C is the bank capacitance; and V is the bank voltage.

Since the stored energy varies as the square of the voltage, it is usually advantageous to hold the capacitance constant and vary the voltage to change energy levels. When the capacitor bank is charged to the desired voltage level a switch between the capacitor bank and transformer disconnects the power supply from the capacitor bank. This is done as a safety precaution to prevent stored energy feedback into the high voltage power supply. The energy stored in the capacitor bank is then discharged through say a three-electrode switch-gap in which the middle electrode acts as the trigger, the energy then being transmitted by say a coaxial cable to the firing members and through the contact electrodes and thence through the explodable conductor.

A number of modifications of this basic circuitry can be employed herein. These range from single shot electrical pulses to multiple transformer-capacitor banks to various designs of multichannel delayed exploder units. Specialty feed energy circuits and components can be employed: for example, the entire explodable conductor system can be made portable simply by making the transformable detachable from the capacitor bank and its connected firing leads and the firing electrode-explodable conductor assembly. Furthermore, the system may be automated or designed for remote firing upon command by a suitable signal such as a radio signal; these versions are of particular interest in weaponry as well as in space applications of the laser light beam. While a direct current transformer is generally employed, fed from conventional power lines, the electrical energy may, as desired, be derived from nuclear energy power sources such as the SNAP or other so-called atomic battery sources of power, together with appropriate circuitry.

Multiple transformer-capacitor banks can be used when rapid recharging and/or use of the stored energy is necessary, as in the case of a fast moving belt or series of projectiles (5 in FIG. 1) each carrying explodable conductors. In some instances, as desired, only a part of the stored energy will be used in the explosion, e.g., with fine wires and thin foils or films, so that the conductor behaves as a fuse in an individual firing to leave sufficient power in the capacitor bank for subsequent firings.

The energy injected into the conductor may vary over extremely wide ranges. In the case of explodable wire 5 mils in diameter and 0.5 inch in length the explosion is induced by energy deposition therein from a 2 microfarad capacitor charged to voltages ranging between 800 and 7000 volts, using a thyratron switch. These values are illustrative and range commensurately downward for so-called "whiskers" and films. At the other end of the energy spectrum, for high energy depositions the power supply may comprise an 8000 volt transformer feeding sixteen 50 microfarad capacitors, the transformer being fed by 3-phase, 60 cycle, 220 volt line. The output is in the range of 800 to 8000 volts, having a maximum energy storage of approximately 25 kilojoules and an average power of about 10 kilowatts. With this example of a high energy source the conductor can be exploded in a single shot or repetitiously. Thus, in the sequential exploding of conductors—

| Pulses/second: | Energy/pulse, kilojoules |
| --- | --- |
| 1 | 8.5 |
| 2 | 4.3 |
| 3 | 2.8 |
| 4 | 2.1 |
| 5 | 1.7 |
| 6 | 1.5 |
| 7 | 1.2 |
| 8 | 1.0 |
| 9 | 0.9 |
| 10 | 0.8 |

The light-producing gas-dispersoid ELS (injected into 1) comprises a dispersed phase of finely divided solid particles, preferably metal, and a dispersing phase of gas or vapor which acts as reactant upon ignition. Numerous combinations of solid dispersoids and gases or vapors can be used. Typically, the dispersed phase is metal or alloy with a suitable dispersing gas such as oxygen. Additives and adjunctives, to provide an enhancement of spectral qualities, include mercury vapor and the inert gases such as helium, neon, xenon and its compounds, argon and krypton.

The light produced by metals reacting with pure oxygen as well as with gases normally considered nonreactive, e.g., nitrogen and carbon dioxide, is very large on a weight basis. For example, igniting in pure oxygen a cloud of one gram of finely divided tantalum gives in one millisecond a burst of visible light amounting to 185 megalumens, accompanied by substantial amounts of ultraviolet and infrared radiations. Under the same conditions the light outputs of various metal clouds are, for example, approximately 40 megalumens for tungsten; 70 megalumens for molybdenum; and 65 megalumens for cerium. In the case of magnesium and aluminum the values will range between approximately 1000 and 1500 megalumens/gram/millisecond. The light outputs will vary with particle size and concentration, and may substantially exceed these typical figures.

The minimum concentrations or dispersions of metal powders in air igniting from a high-voltage, low-energy spark, e.g., continuous at 20 watts, ranges between approximately 0.05 gram and 5 grams per liter for powder size between about 50 microns and 150 microns. This will vary with the mode of preparation of the powder and, of course, with the particular material involved; exceptions include metals like zirconium, which are exceedingly sensitive to luminous deflagration. As the particle size gets below several microns the explosibility characteristic also increases, and in the submicron sizes the material is pyrophoric (in which case an initiating spark or arc or heater element is not always necessary). Furthermore, in an atmosphere of pure oxygen the reactivity increases. Hence, the minimum energy required for ignition of extremely fine and/or highly reactive particulates is so small as to be insignificant in practice. Thus, less than 0.01 joule is sufficient to explode most zirconium samples, whereas less than 0.1 joule will generally suffice for such metals as Dowmetal and elektron (alloys of aluminum (3–12 percent) and manganese (0.2–0.4 percent), with or without zinc (up to 3.5 percent), reduced and carbonyl irons (in an oxygen atmosphere inversely proportional to their fineness), stamped and milled magnesium, magnesium-aluminum alloys, stamped and atomized aluminum, milled titanium, milled manganese, zinc, milled silicon, atomized tin, milled antimony, stamped and atomized lead, cadmium, copper, chromium, selenium, uranium, and the like. It is noted that with certain particulates, such as atomized cadmium and stamped lead that the arc or the resistance heater is preferred for ignition.

Dowmetal and elektron, magnesium, magnesium-aluminum alloys, titanium and zirconium are examples of particulates which ignite in pure carbon dioxide, also finely divided aluminum in certain instances, when the metal cloud particles range from between approximately 50 and 150 microns; in the submicron size range the list is extended to include such metals as beryllium, silver, nickel, zinc, boron, thorium and bismuth. In an atmosphere of nitrogen or one of the nitrogen oxides luminous reaction occurs when the temperature is raised sufficiently, as for example in the cases of magnesium (530° C.), tin (900° C.), zirconium (530° C.), magnesium-aluminum alloys (550° C.) and Dowmetal and elektron (630° C.), for particles in the range between about 50 and 150 microns.

For the aid of those skilled in the art, following are typical Hartmann apparatus values for various ELS reactants (where the ignition source is a spark) C is the concentration in grams per liter; p.s.i. pounds per square inch; particle size approximately 50 to 150 microns; air atmosphere; T is the time from ignition to maximum pressure in milliseconds; P is the pressure):

| Powder | Maximum P, p.s.i. | Rise P Rate, p.s.i./second | | T | C |
|---|---|---|---|---|---|
| | | Average | Maximum | | |
| Aluminum (atomized) | 32 | 250 | 500 | 128 | 0.1 |
| Magnesium (milled) | 38 | 630 | 1,210 | 60 | 0.1 |
| Titanium (milled) | 26 | 250 | 430 | 104 | 0.1 |
| Iron (carbonyl) | 22 | 360 | 600 | 60 | 0.2 |
| Magnesium (milled) | 41 | 490 | 860 | 84 | 0.2 |
| Silicon (milled) | 28 | 150 | 360 | 190 | 0.2 |
| Titanium (milled) | 41 | 420 | 830 | 98 | 0.2 |
| Zirconium (milled) | 14 | 100 | 140 | 140 | 0.2 |
| Manganese (milled) | 9 | 50 | 75 | 180 | 0.5 |
| Tin (atomized) | 26 | 240 | 400 | 108 | 0.5 |
| Zinc (condensed) | 11 | 90 | 100 | 122 | 0.5 |
| Dowmetal (milled) | 52 | 1,240 | 1,800 | 42 | 1.0 |

The processes generally employed for the production of fine metal powders include atomization, chemical precipitation, reduction by carbon monoxide or hydrogen, condensation, decomposition of such compounds as carbonyls, electrolytic deposition, graining, machining, milling, shotting and stamping, with combinations and variations often being employed. Vapor condensation methods, e.g., set out in U.S. 3,065,958, yield powders as fine as 0.03–0.06 micron, with large surface areas, e.g., $75 \times 10^4$ cm.$^2$/gm. The particle sizes given by other processes vary from several microns to several hundred microns.

Yet another ELS composition characterized by exceptional luminosity typically comprises a mixture of three parts of tetranitromethane, one part of toluene and up to several parts of a gas such as argon; as may be desired, a few tenths of a percent of particulate brisant explosive such as trinitrotoluene may be added. The luminosity of such mixtures is exceedingly great; one cubic centimeter of the first two-named liquids in a vapor state, together with the said amount of gas such as argon, produces a burst of light in excess of 10 megacandles, the flash of light lasting less than 5 microseconds. As desired, a few tenths of a percent of metal particulate such as copper, aluminum or iron enhances the light output by augmenting the more or less continuous spectrum with lines characteristic of the particulate. The gas such as argon is but one example of a number that can be employed; generally, the luminosity of the accompanying detonation increases with the density of the gas, e.g., being in the order of hydrogen, nitrogen, oxygen and chlorine; and helium, neon, argon and krypton; least luminosities are obtained with hydrogen and helium.

Related to the gas-dispersoid ELS is the sol, e.g., mist, of light-shock giving substance admixed with reactant which can be gas, vapor or sol. Examples are metal alkyls such as diethyl aluminum chloride, trimethyl aluminum, triethyl aluminum and diethyl zinc; all of these substances are clear, colorless liquids which can be vaporized or produced in mist or like aerosol form, as by the use of nozzles coupled to 1. The reactant may be water aerosol or air, in which case there is a violent reaction involving low order detonation with the concurrent production of light energy.

For specialty applications of this invention the light from a high power laser itself can be employed to generate intense thermal energies within a solid characterized as luminously explodable when the temperature of that solid is suddenly and very quickly raised to a very high temperature; the rays from a laser are known to act in this fashion upon many solids, including metals (especially those of crystallite structure, carbon, and the like). The laser heat which is absorbed into such a solid together with the heat resulting from conversion of light energy which penetrates below the solid surface partially converts into that solid in gaseous form, the gaseous form being under pressure due to the relatively slow transfer of heat by the solid, such that spallation occurs with concurrent luminosity and shock energy, known to those in the art as "laser plumes." For example, when a laser light ray strikes carbon (50 megawatt pulse at about 40–50 nanoseconds duration), the carbon spalls off in a low-order detonation with the release of light together with the shock.

The tentative explanation for this is that laser energy absorption takes place too rapidly and at too high an energy level to be explained in conventional thermodynamic terms; rather, the effect is believed to be due to because the subsurface carbon reach a vaporization temperature before the surface of the carbon has absorbed its latent heat of vaporization. This leads to a pulse of high pressure and subsequent superheating of the underlying carbon until the temperature rises above the critical point. There is then no longer any distinction between the superheated solid and the highly condensed gas, so the reaction proceeds as though it were an ordinary thermal explosion. In the case of solids composed of crystallites, sorbed materials such as gases behave in an essentially similar manner, causing the crystallites to spall or blow apart, the spalling particles incandescing according to the well known laws of temperature dynamics. I therefore do not exclude a new kind of light source in connection with this invention: namely, that which involves impingement of a laser light beam of energy sufficient to cause the entrapment of heat and the build-up of heat to the point where in an appropriate solid such as carbon or crystallized metal there is released both light and shock energies. The latter are separated from the former in one or more of the various ways set forth herein. The laser resonator in this embodiment is a set unit or an array of units arranged to impinge upon a spallable luminous energy releasing target material 5 fed into chamber 1.

Throughout the drawings the frangible optic element is designated by the numeral 6. By frangible optic I mean a member which, upon being struck by the light energy from the explodable light source (as from 1 and 2, the LS in FIG. 1) routes that light energy as light L freed of shock and like non-optical forms of energy into the light leg (as 3 in FIG. 1) are thence into the irradiable target 8.

For purposes of this disclosure the term "frangible" will be equivalent to "breakable," "destructible," "burnable," "sublimable," "vaporizable," and the like. The reason for this is that the "frangible optic element" 6, e.g., mirror, can have qualities other than simple mechanical frangibility or breakability. Thus, the mirror can be simultaneously reflective for say the visible portion of the electromagnetic spectrum and absorptive for the infrared, the latter causing the sublimation, burning, vaporization or the like of the mirror member 6. Although the two radiations have the same velocity, reflection occurs first with a time constant of the order of $10^{-15}$ second or less, whereas burning, sublimation, ablative and like mechanisms take longer, e.g., greater by several or more orders of magnitude, because heat transfer is slower and change of state processes are slower; pure and simple reflection, for example, involves no change of state, whereas absorbed energy requires time to manifest itself as change of state, e.g., to vapor, reaction products, sublimone, or pyrofragments.

Furthermore, the mechanically destructible, i.e., frangible, mirror or the like, can comprise the substrate for an optic coating of material of vaporizable, sublimable, ablative, or of like nature. Or, the substrate may be burnable, as for example paper or thin combustible plastic (e.g., cellulose, nitrated cellulose) coated with a light reflecting metal (e.g., aluminum, magnesium, zirconium or the like) which burns.

These varieties and modifications of the optic element are preferred when the explodable light source is characterized by low order detonation which serves to sweep the debris into the shock sink leg, by ELS having large heat outputs, and/or by systems characterized by irradiable targets which are extremely sensitive to heat that may be reflected into the target leg of the system. Also, in that modification of the mirror which first responds with visible light reflection into the target leg and quickly thereafter emits a brilliant flash of light on the process of its own destruction. The thin metal coating just mentioned comprise one example; another is metal or flash composition as a coating upon the frangible member; another is a solid, luminously decomposable noble gas compound such as a xenon fluoride coated upon the frangible member.

While the frangible optic can be feed into the shock sink apparatus in translational (including to-and-fro and rotational (FIGS. 2A and 2B respectively)), through appropriate slits, feedthroughs or the like within the walls of the said apparatus, the frangible optic may or may not feed on through the device; thus, the frangible optic may feed through the tubular body as depicted in FIG. 2. Roll feed-in (as in FIG. 2) and plate-type feed-in (as in FIG. 1) have already been described.

Mechanical fragmentation of the light reflective frangible optic 6 is usual and preferred. Not excluded, however, are the diffraction grating (metallized); dichroic or multilayer mirrors or filters which, for example, pass infrared or heat or reflect in a given optical region. Also, diffraction gratings, set at an appropriate angle, which separte and divert light L from the admixture LS into the irradiable target 8.

A novel version of the diffraction grating kind of frangible optic comprises a replica reflection grating which has been dyed. I have found through experiment that such a grating, when dyed or colored with materials such as rhodamine, eosine, thioflavine, methylene blue, or the like, will provide a spectrum corresponding to the absorption spectrum of the dyestuff in question.

The frangible optic member (6 of FIG. 1) is typically a rupturable plane mirror, as for example thin metal or front-surface metallized glass or brittle plastic; in the latter instance the metal coating can be of any desired kind, to provide wide or narrow band light reflection. The reflector may be preferentially reflective, as in the case of a dichroic reflector.

When it is desired to utilize with minimal absorption (e.g. from a filter at W) only a narrow band of light and exclude others from passing down the light leg 3 of the system, the frangible optic member is best a reflecting diffraction grating of the replica kind. By properly positioning the reflection grating according to the principles of spectrometry and employing either a slit or a ring hole at W in the light leg egress or port, depending upon whether the diffraction grating is ruled parallel or circularly, light of a high degree of monochromaticity is obtained. The grating may be designed for regions ranging between several hundred Angstrom and about one micron, corresponding to the extremes of vacuum ultraviolet and the far infrared, with grooves of between approximately 0.8 to 3600 millimeters and blazes between about 1° and 70°. The metallization on the grating may be such as to reduce scatter of unwanted wavelengths and enhance retrieval of wanted wavelengths, as in the case of gold for the red and infrared regions.

Whereas a plane destructible or frangible optic is utilized in most modifications of this invention, I do not exclude optics of a non-planar character, as for example convex, concave, elliptical and the like. For example, a concave mirror 6 having a focal length corresponding to the irradiable target 8 (e.g. in FIGS. 1 and 2) provides an intensification of light striking that target; by the same token a concave reflection grating eliminates the need for solid optic trains such as lenses which exhibit fresnel reflection and absorption of the light.

When I employ the term "irradiable target" I use the expression in its very broadest sense. As will be evident to those skilled in the art, an "irradiable target" (as 8 in FIGS. 1 and 2) may, in particular, be a laser resonator, a vessel transparent to the light L in which there is contained material for photochemical reaction, said material being solid, gas or liquid, as desired; living tissue (as in the case of research upon the effects of thermal energy upon healthy or diseased tissue); or the like.

The light leg (or target leg) of the system (3 of FIGS. 1 and 2) can be open or closed; when open account must be taken of the negative pressure created at the light port 8' when the shock wave S travels down into the shock sink 4; in the preferred modification the target leg 3 may be closed at the port or exit by a suitable window W. The window W can be grating when it is desired to obtain light of high degree of monochromaticity, or a dichroic filter when it is desired to irradiate a target highly susceptible to shock and when there is residual or spillover shock from the ELS, as in the case of chemical explosive ELS. As an adjunct a suitable electro-optic shutter, based upon the Kerr or Pockels effects may also be used for this purpose; or, an Andrews separator (based upon chromatic aberration differences) may be employed, although the exit light is of much reduced flux.

Moreover, W may be of fused silica, clear sapphire, fluorite, or the like. Tinted glass or plastic filters can be used for the visible; also useful is the Christiansen or refraction monochromator filter, as well as the Ohman or chromatic polarization filter, the two latter elements being especially useful over a broad range of the visible and adjacent ultraviolet and infrared regions. The light port 8' may be coupled with a sturdy train of prisms, after the manner of a direct vision spectroscope, having a slit at the opposite end, so as to isolate a particular line or band. Finally, lenses and/or mirror trains of any desired kind can be employed at the light port.

The window W may be replaceable; that is, a series of windows or other members can be slipped linearly into position at any convenient or necessary interval, or positioned by circular or like feed.

The laser (optical maser, uvaser, iraser—as it is also called) light wave generator (also termed cavity, active species, resonator or the like) may be solid, liquid or gaseous or combinations thereof, as dictated by pumping energy requirements and the particular modification of this invention. A number of such coherent and near-coherent laser oscillators are well known in the art and they are increasing very rapidly in number and complexity, ranging from simple cylindrical rods which are usually pumped through the sides and have optically plane and parallel ends (e.g., 100% reflective on one end and a few to zero percent mirroring on the exit end), confocal ends, one fresnel end, or the like; also cubic, prismatic, hexagonal and like configurations; also, fiber optic assemblies light-piping the pumping light into the lasing species; also, composite systems such as ruby overlaid with sapphire (usually side-pumped) or the same of gadolinium-doped or neodymium-doped or ytterbium-doped glasses overlaid with glass (also usually side-pumped), as well as trumpet or coned assemblies made of a shank member carrying the negative temperature medium and a cone or trumpet end of sapphire, glass or other material, depending upon the particular oscillator involved (pumped through the cone face, usually full mirrored on the end of the cavity shank).

The power build-up in the lasing system may be controlled in one or more of several ways, including the usual full and partial (or no) reflective coatings (metallic or dielectric) as well as by various shutters, e.g., electro-optical (Kerr and/or Pockels), magnetic, and/or mechanical. Features such as Q-spoiling can be employed, as can cryogenic reinforcement for lasing efficiency, information being set out in such sources as "Masers and Lasers," Office of Technical Services, U.S. Department of Commerce, Selective Bibliography SB-488; "Masers—A Literature Search," by H. D. Raleigh, U.S. Atomic Energy Commission, TID–3566, August 1961; "Lasers, A Bibliography," University of California, Ernest O. Lawrence Radiation Laboratory, UCRL–6769, January 1962; 'Masers, Literature Search No. 57," Astronautics Information, Jet Propulsion Laboratory, California Institute of Technology, Pasadena, California, Feb. 15, 1960; "Masers and Lasers," by Graduates of the Harvard University Graduate School of Business Administration, Cambridge, Mass., 1962; "Masers and Lasers" by E. B. Rechsteiner and R. L. Saxe, New York, 1962 (with supplement, 1962); and others. However, for purposes of this disclosure the following are representative laser resonator systems:

TYPICAL LASER RESONATOR SYSTEMS

| State and material | Active element | Wavelength (in Angstroms or microns) |
|---|---|---|
| Crystal: | | |
| Ruby, Al$_2$O$_3$ | Cr$^{3+}$ | 6,929–6,943, 7,009–7,041 |
| Barium fluoride, BaF$_2$ | U$^{3+}$ | 2.556 |
| | Nd$^{3+}$ | 1.06 |
| Calcium fluoride, CaF$_2$ | Sm$^{2+}$ | 7083 |
| | U$^{3+}$ | 2.24–2.61 |
| | Dy$^{2+}$ | 2.36 |
| | Tm$^{2+}$ | 1.116–1.189 |
| | Ho$^{3+}$ | 2.05 |
| | Nd$^{3+}$ | 1.046 |
| Calcium molybdate, CaMoO$_4$ | Nd$^{3+}$ | 1.06 |
| Calcium tungstate, CaWO$_4$ | Nd$^{3+}$ | 1.063 |
| | Pr$^{3+}$ | 1.047 |
| | Ho$^{3+}$ | 2.046 |
| | Er$^{3+}$ | 1.612 |
| | Tm$^{3+}$ | 1.911 |
| Strontium tungstate, SrWO$_4$ | Nd$^{3+}$ | 1.06 |
| Lanthanum trifluoride, LaF$_3$ | Nd$^{3+}$ | 1.06 |
| | Pr$^{+3}$ | 5985 |
| Strontium molybdate, SrMoO$_4$ | Nd$^{3+}$ | 1.064 |
| | Pr$^{3+}$ | 1.047 |
| Strontium fluoride, SrF$_2$ | U$^{3+}$ | 2.407 |
| | Sm$^{2+}$ | 6967 |
| | Tm$^{3+}$ | 1.91 |
| | Nd$^{3+}$ | 1.06 |
| Na$_{1/2}$La$_{1/2}$MoO$_4$ | Nd$^{3+}$ | 1.06 |
| Lead molybdate, PbMoO$_4$ | Nd$^{3+}$ | 1.06 |
| Plastic: Europium Triflurothienylbutanedione in polymethyl methacrylate | Eu$^{3+}$ | 6130 |
| Glass: | | |
| Borosilicate glass | Nd$^{3+}$ | 1.06 |
| Lanthanum-Borosilicate glass | Nd$^{3+}$ | 1.06 |
| Li-Mg-Al-Si | Yb$^{3+}$ | 1.02 |
| Li-Mg-Al-Si | Gd$^{3+}$ | 3125 |
| Li-Mg-Al-Si | Ho$^{3+}$ | 1.95 |

| Liquid | | Pump | |
|---|---|---|---|
| Benzene | Stimulated Roman scattering. | 8,819, 7,455, 8,052 | Ruby laser. |
| Dueterated benzene, C$_6$D$_6$. | do | 7,430, 7,990 | Giant pulse. Ruby laser. |
| Nitrobenzene | do | 7,658, 8,539, 9,632 | Do. |
| Toluene | do | 7,463 | Do. |
| 1 bromonaphthalene | do | 7,672 | Do. |
| Pyridine | do | 7,457, 8,053 | Do. |
| Cyclohexane | do | 8,658 | Do. |
| Europium benzoylacetonate in alcohol. | Eu$^{3+}$ | 6,100 | |

In the aforementioned tabulation of examples of laser resonators the liquid lasers are generally pumped by means of a giant pulse ruby laser. When a Q-spoiling attachment is incorporated into the laser light generating system 8 of this invention the result is that liquid lasers can be used as secondary targets, to be pumped by 8.

I claim:
1. In combination with an irradiable target characterized as shock-sensitive, for the irradiation of said target with electromagnetic energies covering the region between approximately the infra-X-ray and the trans-infrared portions of the spectrum, the system which comprises: a shock-producing light source aligned to strike a breakable reflective optic upon activation of said light source; said optic optically coupled to said light source; an irradiable target optically coupled to said breakable optic, whereby to provide via said optic a light-coupling between said target and light source.

2. A laser light generator comprising a laser resonator optically coupled at one angle to a frangible optic member, said frangible optic member characterized as reflective to electromagnetic radiation and destructible by non-electromagnetic radiation, said non-electromagnetic radiation characterized as having a velocity less than the velocity of the said electromagnetic radiation; an explosive light source characterized as producing both electromagnetic and non-electromagnetic radiations, said explosive light source being optically coupled at a second angle to the said frangible optic member, said second angle being different from the said first angle, whereby upon actuation of the said explosive light source to produce both of the said radiations the electromagnetic radiation from the explosive light source is coupled by means of the said reflective frangible optic member with the said laser resonator; and a sink member for the said non-electromagnetic radiation and the debris from the frangible optic member which is struck subsequent to the said reflection therefrom said member, the said sink member being arranged at a third angle characterized as different from the said first angle, whereby the non-electromagetic radiations and said debris are diverted from the laser.

3. The laser light generator of claim 2 wherein the explosive light source is a chemical explosive.

4. The laser light generator of claim 2 wherein the explosive light source is derived from electrical energy.

5. The laser light generator of claim 2 wherein a series of explosive light sources is actuated sequentially and synchronously with a series of frangible optic members.

6. In an electrooptical circuit a destructible, reflective member optically coupled at a first angle with an explosive source of light and optically coupled at a second angle with an irradiable target, the said second angle characterized as being different from the said first angle, and a receptacle arranged at a third angle, said third angle characterized as being different from the said first angle, whereby upon explosion of the said explosive source of light there is generated optical and near-optical rays together with shock and debris energies, the said rays having velocities greater than the velocities of the said energies, such that the rays reach the said reflective member before the said energies and reflect at the first angle from the said member and thereafter the said energies strike the said destructible, reflective member, whereby to destroy same, and together with the debris from the destroyed member carry into the said third angle and away from the second angle into the said receptacle such that deposition of the shock and debris energies takes place.

7. In an electrooptical circuit as recited in claim 6 wherein the destructible, reflective member and the said explosive source of light are placed in optical opposition and feed a series of pulses of the said rays to the said irradiable target by reflection from the said destructible, reflective member and subsequently the reflective member is destroyed by the said energies, the said energies pass into the said third angle, whereby to by-pass the said irradiable target.

No references cited.

JEWELL H. PEDERSEN, *Primary Examiner.*

B. J. LACOMIS, *Assistant Examiner.*